(12) United States Patent
Smith et al.

(10) Patent No.: US 10,790,995 B2
(45) Date of Patent: Sep. 29, 2020

(54) ORACLE AUTHENTICATION USING MULTIPLE MEMORY PUFS

(71) Applicant: Intel Corporation, Santa Clara, CA (US)

(72) Inventors: Ned M. Smith, Beaverton, OR (US); Rajesh Poornachandran, Portland, OR (US)

(73) Assignee: Intel Corporation, Santa Clara, CA (US)

(*) Notice: Subject to any disclaimer, the term of this patent is extended or adjusted under 35 U.S.C. 154(b) by 220 days.

(21) Appl. No.: 16/022,372

(22) Filed: Jun. 28, 2018

(65) Prior Publication Data

US 2019/0044740 A1    Feb. 7, 2019

(51) Int. Cl.

| | |
|---|---|
| *H04L 29/06* | (2006.01) |
| *H04L 9/32* | (2006.01) |
| *H04L 9/08* | (2006.01) |
| *H04L 9/06* | (2006.01) |
| *H04L 29/08* | (2006.01) |
| *H04W 12/00* | (2009.01) |

(52) U.S. Cl.
CPC .......... *H04L 9/3278* (2013.01); *H04L 9/0637* (2013.01); *H04L 9/0822* (2013.01); *H04L 9/0869* (2013.01); *H04L 9/3213* (2013.01); *H04L 9/3239* (2013.01); *H04L 9/3242* (2013.01); *H04L 67/12* (2013.01); *H04W 12/009* (2019.01); *H04L 2209/38* (2013.01)

(58) Field of Classification Search
CPC ..... H04L 9/3278; H04L 67/12; H04W 12/009
See application file for complete search history.

(56) References Cited

U.S. PATENT DOCUMENTS

| | | | | |
|---|---|---|---|---|
| 2009/0083833 | A1* | 3/2009 | Ziola | H04L 9/3278 726/2 |
| 2018/0006830 | A1* | 1/2018 | Cambou | H04L 9/3278 |
| 2019/0215688 | A1* | 7/2019 | Zavesky | H04L 67/28 |
| 2019/0385489 | A1* | 12/2019 | Norrman | H04L 9/0631 |

OTHER PUBLICATIONS

Mughal et al., "Physical Unclonable Function Based Authentication Scheme for Smart Devices in Internet of Things", pp. 160-165 (Year: 2018).*
Lee et al., "Mutual Authentication in Wireless Body Sensor Networks (WBSN) based on Physical Unclonable Function (PUF)", pp. 1314-1318 (Year: 2013).*

* cited by examiner

*Primary Examiner* — Thaddeus J Plecha
(74) *Attorney, Agent, or Firm* — Schwegman Lundberg & Woessner, P.A.

(57) ABSTRACT

Systems and methods of oracle authentication in a network using a plurality of memory physical unclonable functions (PUFs). Method starts with oracle receiving initialization vector including initial seed value from client device. Oracle generates template that includes a PUF array. Oracle computes template using a superset of combinations of PUFs included in the oracle and transmits template to client device. Oracle generates first seed value, first key, and first authentication nonce, using pseudorandom number generator and the initial seed value. When oracle has first data to be sent to the client device, oracle generates first token using PUF array and first authentication nonce. Oracle generates first message by encrypting first data and first token using first key. The oracle transmits first message to the client device. Other embodiments are also disclosed.

25 Claims, 7 Drawing Sheets

ORACLE AUTHENTICATION USING MULTIPLE MEMORY PUFS

TECHNICAL FIELD

Embodiments described herein generally relate to oracle authentication in networks and, in some embodiments, more specifically to authenticate oracles in a fog network by making use of the memory physical unclonable functions (PUFs).

BACKGROUND

Fog and Internet of Things (IoT) networks can be constructed using constrained sensor environments called "oracles." Oracles can produce a stream of data values to be received and processed by multiple subscribers on various client devices. The stream of data values produced by the oracles should be authenticated before use. However, oracles cannot easily implement a public key infrastructure (PKI) for authentication and also do not have the capacity to scale to large numbers of transport layer security (TLS) or similar secure communication connections to its subscriber base.

In Fog and IoT networks, it is difficult to ensure that a subscriber is receiving a message that is intended for that subscriber and that the message originated from the expected oracle. Existing authentication solutions depend on heavyweight transport layer encryption such as TLS and data transport layer security (DTLS), where the oracle maintains an authentication certificate using a heavy weight PKI. These existing solutions cannot easily scale to even a couple of hundreds of subscribers. Oracles can handle up to ten simultaneous connections to subscribers and can have less than a kilobyte available for supporting these subscribers. Further, using these existing solutions, there is no verifiable or auditable public ledger on the messages exchanged for any loyalty or reward apportionment.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

In Internet of Things (IoT) trusted computing, it is becoming increasingly important to help protect systems and data from malicious attacks and adversaries. In the fog and IoT networks that are constructed using oracles, authentication of the oracle is needed to ensure to the subscribers that the messages received are intended to the subscribers and are originating from the expected oracles.

In embodiments described here, physical unclonable functions (PUFs) associated with each of the oracles is used for oracle authentication. A PUF is a mathematical function that is derived from the behavior of a complex physical object or device. The object can be excited by many possibly stimuli upon which it reacts with corresponding responses. The object's behavior can be regarded as a function that maps stimuli to responses. Accordingly, since PUFs are based on physical variations that occur naturally during the semiconductor manufacturing, PUFs can uniquely identify a semiconductor device.

In an embodiment, many memory PUFs are randomly selected as an authenticator such that a man-in-the-middle (MITM) attacker wishing to replay data values or inject false data values cannot anticipate the authenticator.

Figure 1:
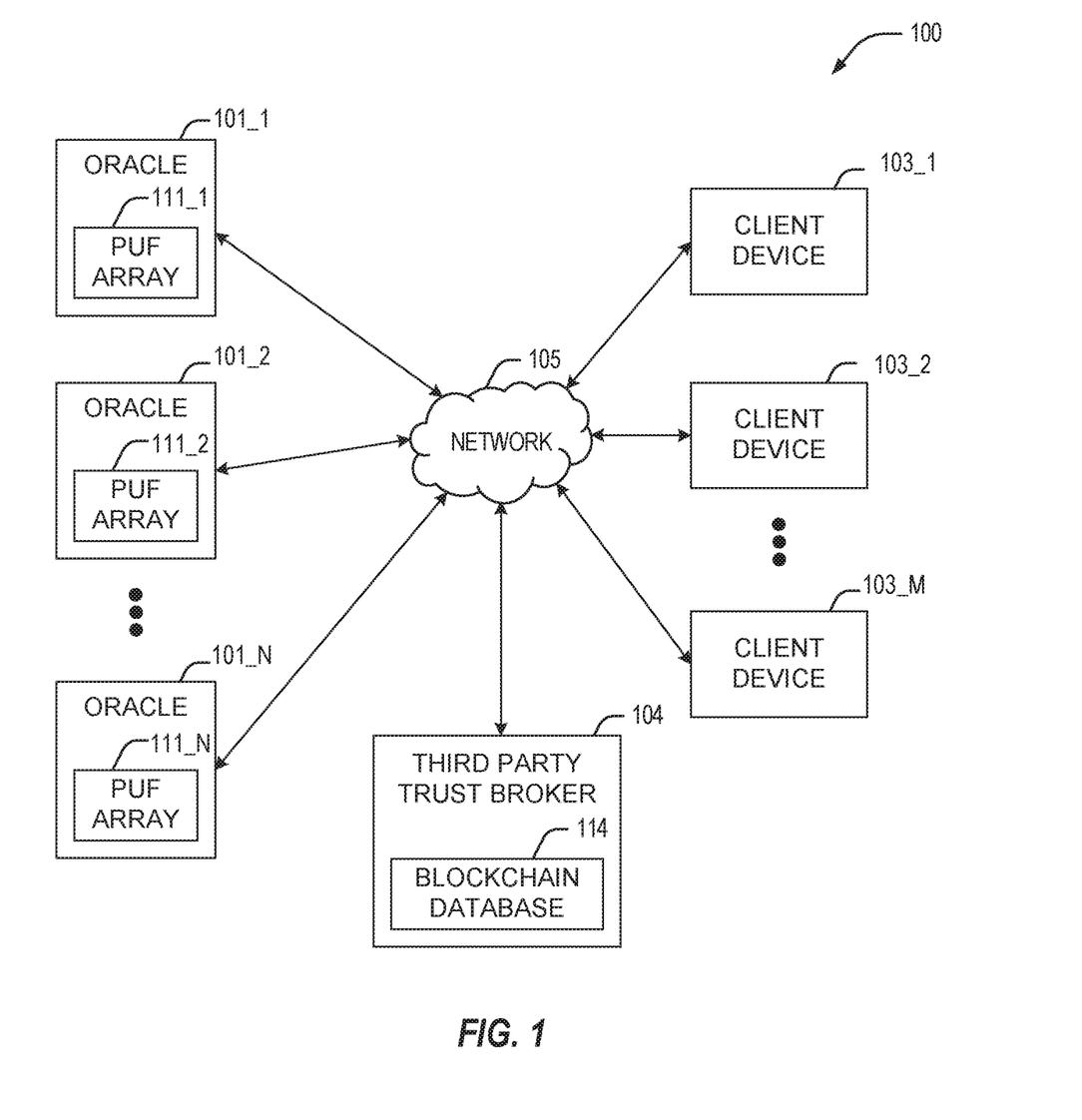
FIG. 1 is a block diagram of an example of a system for oracle authentication using memory PUFs, according to an embodiment.

FIG. 1 is a block diagram of an example of a system 100 for oracle authentication using memory PUFs, according to an embodiment. The system 100 includes a plurality of oracles 101_1, 101_2, . . . , 101_N (N>1), a plurality of client devices 103_1, 103_2, . . . , 103_M (M>1), and a third-party trust broker 104. In the system 100, the oracles 101_1, 101_2, . . . , 101_N, the client devices 103_1, 103_2, . . . , 103_M, and the third-party trust broker 104 are coupled via a network 105. In an embodiment, the system 100 is an IoT fog system as discussed in FIG. 7.

Figure 8:
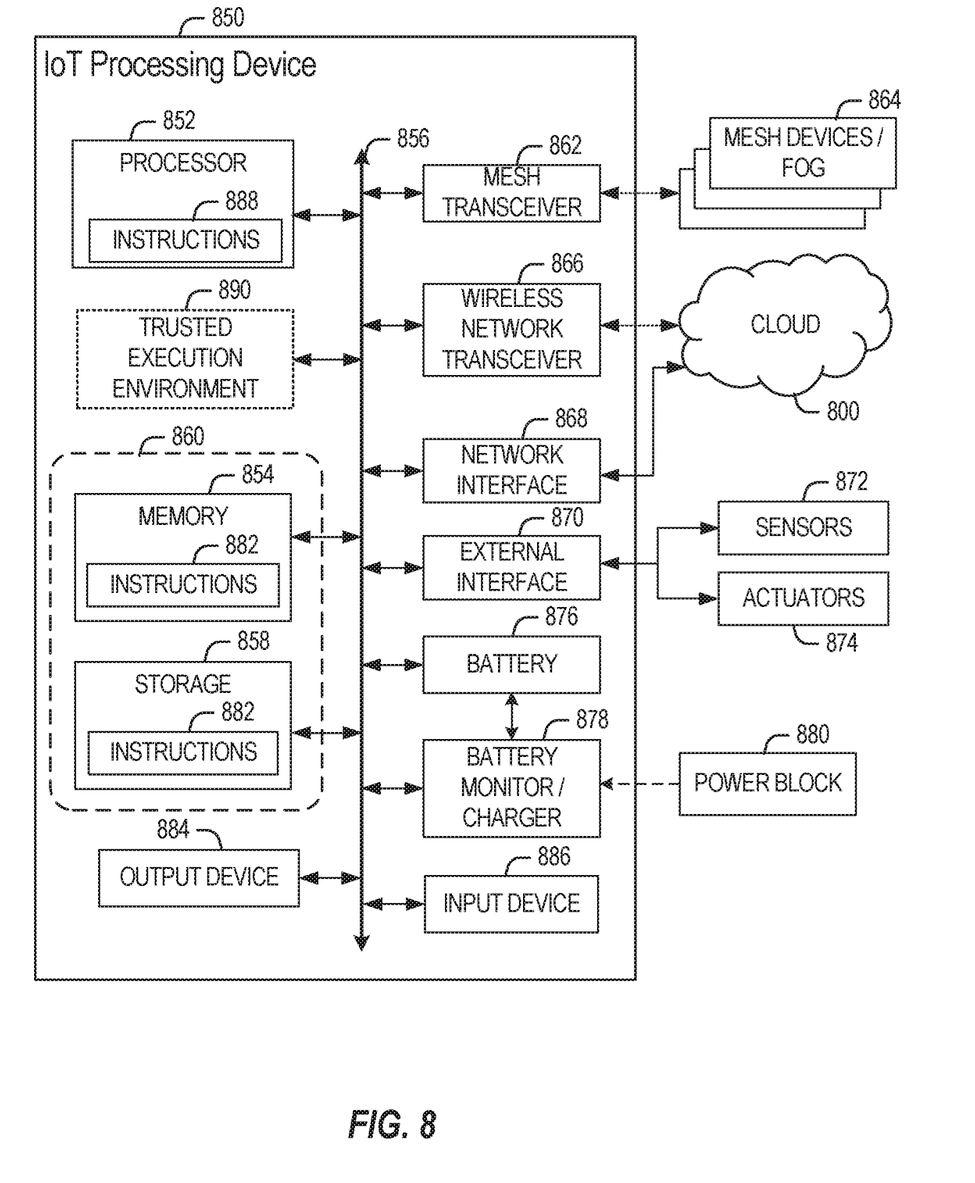
FIG. 8 is a block diagram illustrating an example of a machine upon which one or more embodiments can be implemented.

Oracles 101_1, 101_2, . . . , 101_N are constrained sensor environments that produce a stream of data values received by subscribers. The subscribers can respectively receive data values via client devices 103_1, 103_2, . . . , 103_M that are machines 800 as illustrated in FIG. 8. To transmit the data values to the client devices 103_1, 103_2, . . . , 103_M, the oracles 101_1, 101_2, . . . , 101_N can use the third-party trust broker 104 to establish a secure distribution channel between the oracles 101_1, 1012, . . . , 101_N and the client devices 103_1, 1032, . . . , 103_M.

Figure 7:
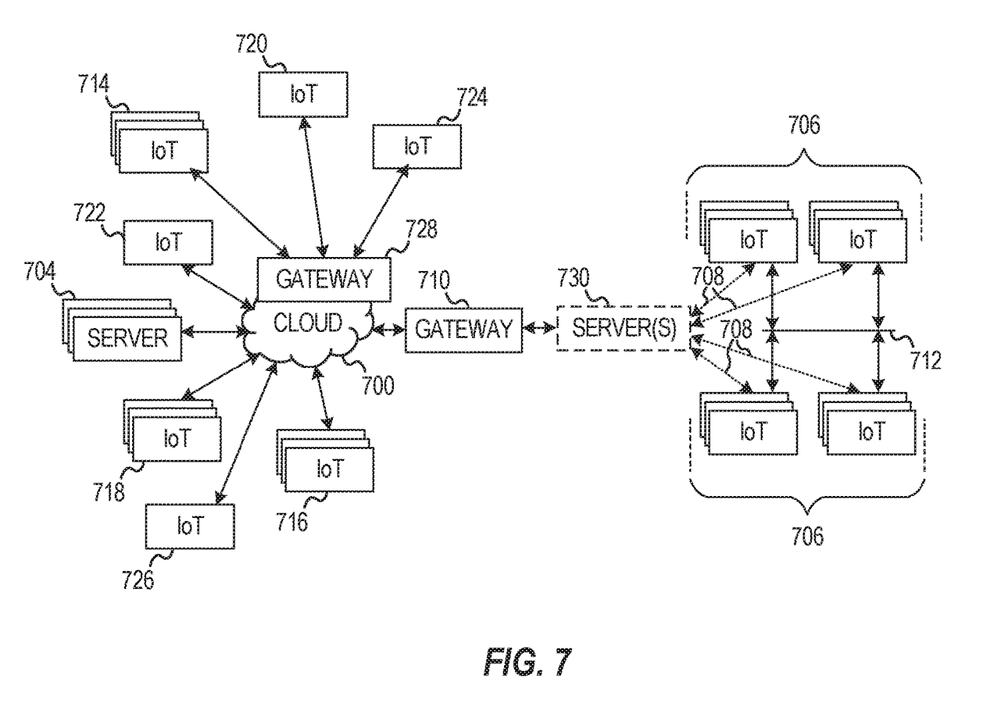
FIG. 7 illustrates a diagram of a cloud-computing network, or cloud, in communication with a number of Internet of Things (IoT) devices.

The network 105, over which the oracles 101_1, 101_2, . . . , 101_N, the client devices 103_1, 103_2, . . . , 103_M, and the third-party trust broker 104 are coupled, can be a cloud-computing network, or a cloud 700 as illustrated in FIG. 7. The network 105 can represent the Internet or can be a local area network (LAN), or a wide area network (WAN), such as a proprietary network for a company.

Figure 2:
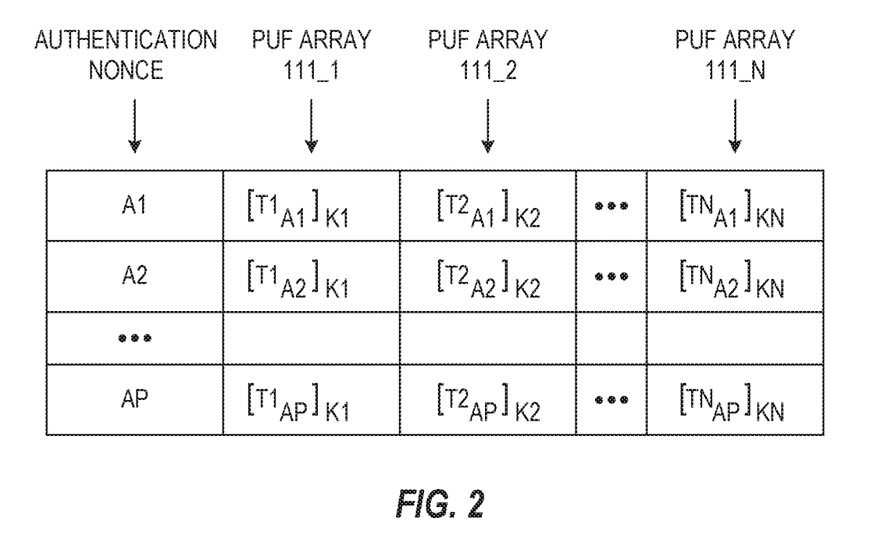
FIG. 2 illustrates the details of a PUF array associated with each oracle in FIG. 1, according to an embodiment.

In an embodiment, the oracles 101_1, 101_2, . . . , 101_N maintain and store PUF arrays 111_1, 111_2, . . . , 111_N, respectively. FIG. 2 illustrates the details of PUF arrays 111_1, 111_2, . . . , 111_N associated with oracles 101_1, 101_2, . . . , 101_N in FIG. 1, according to an embodiment. In FIG. 2, each column represents one PUF array 111J (where, J=>1 and J<=N) that is associated with one oracle 101J. For example, the first column represents the PUF array 111_1 associated with the first oracle 101_1. Each row i (where, i>=1 and i=<P) in the PUF array 111_1 is an entry associated with an authentication nonce (Ai). Each entry in the PUF array 111_1 is a transaction $[T1_{Ai}]_{K1}$ that is associated with an authentication nonce (Ai) and that includes an authentication token (T1) and a cryptographic message authentication checking key also known as MACing key (K1). Each of the transactions (e.g., $[T1_{Ai}]_{K1}$) can also be referred to as a PUF-specific authenticated token instance (or "PUF instance").

The third-party trust broker 104 maintains transaction logging and audit operational flow. The third-party trust broker 104 can receive from each of the oracles 101_1, 101_2, . . . , 101_N their respective transaction knowledge about interactions with other oracles 101_1, 101_2, . . . , 101_N and client devices 103_1, 103_2, . . . , 103_M. The third-party trust broker 104 can also receive from each of the oracles 101_1, 101_2, . . . , 101_N information on relevant events observed (e.g., PUF arrays, geolocation, time, etc.). The third-party trust broker 104 can store the transaction knowledge about interactions and the information on relevant events. In an embodiment, the third-party trust broker 104 can include a blockchain database 114 as shown in FIG. 1.

In an embodiment, the encrypted data from the oracle 101_1, 101_2, . . . , 101_N can be delivered from point-to-point to one or more of the client devices 103_1, 103_2, . . . , 103_M (e.g., from the oracle 101_1 to the subscriber using client device 103_1). In another embodiment, the oracle content can be integrated into a blockchain such that the encrypted data from the oracle 101_1, 101_2, . . . , 101_N can be delivered to the client devices 103_1, 103_2, . . . , 103_M through a blockchain.

Figure 3:
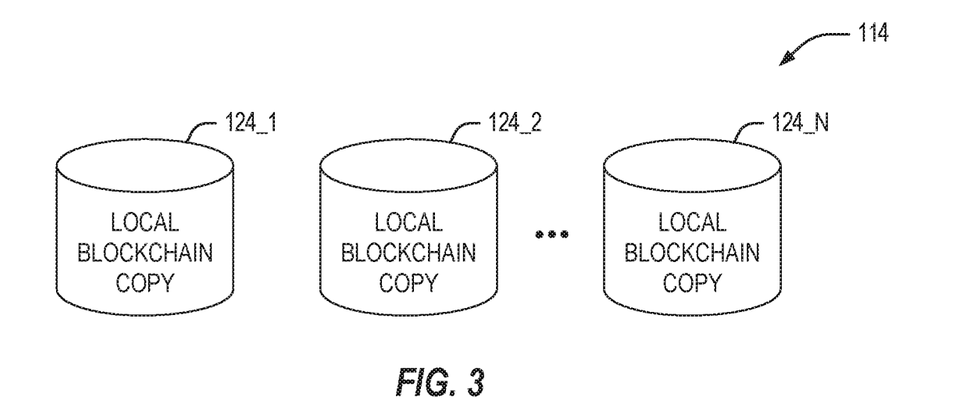
FIG. 3 illustrates the details of the blockchain database in FIG. 1, according to an embodiment.

Referring to FIG. 3, the details of the blockchain database 114, according to an embodiment, are illustrated. As shown in FIG. 3, the blockchain database 114 can include a plurality of a local blockchain copies 124_1-124_N that are respectively associated with the oracles 101_1, 101_2, . . . , 101_N. Each of the local blockchain copies 124_1-124_N can be a blockchain with distributed consensus. Blockchain entries provide a tamper resistant audit trail that can easily be used by agents (e.g., client devices, oracles) and evaluators for auditability, reward tracking, delivery for the subscribers based on crowd-sourced transactions.

Figure 4:
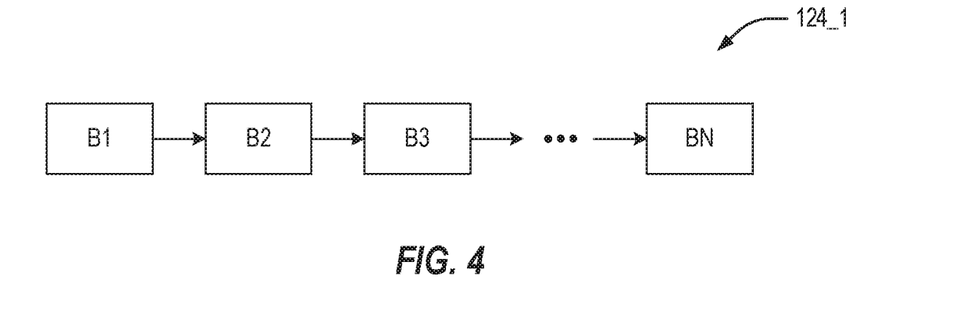
FIG. 4 illustrates the details of one of the local blockchain copy from FIG. 3, according to an embodiment.

Referring to FIG. 4, the details of one of the local blockchain copy 124_1 from FIG. 3 is illustrated, according to an embodiment. As shown in FIG. 4, the local blockchain copy 124_1 includes a plurality of blocks (Bx) (x>0 and x≤N). In an embodiment, each of the blocks (Bx) is a summation or concatenation of all the transactions of the oracles 101_1, 101_2, . . . , 101_N associated with a given nonce Ax:

$$\sum_{i=1}^{N}[Ti_{Ax}]_{K_i}$$

In an embodiment, i iterates through each of the oracles 101_1, 101_2, . . . , 101_N and x identifies the instance of the authentication nonce. In another embodiment, i iterates though a group of oracles that is a subset of all of the oracles (where n>N). In this embodiment, the transactions to be grouped can be selected and stored within the same block in this manner. By using a summation or concatenation of the transactions in a block, storage space in the local blockchain copy 124_i can be optimized, but there is a time tradeoff.

When accessing the local blockchain copy 124_i to verify a transaction, each of the transaction values $[Ti_{Ax}]_{Ki}$ need to be reproduced and concatenated or summed in order to check against the values stored in the blocks. Further, to make a synchronized change across each of the oracles 101_1, 101_2, . . . , 101_N, the concatenation or summation adds further delay to the update.

While the storage space in the local blockchain copy 124_i is not optimized, in order to improve on the time delay issues, each of the blocks (Bx) in an embodiment can store a single transaction for a given oracle 101_i at an instance x of the authentication nonce:

$$[Ti_{Ax}]_{Ki}$$

Accordingly, the benefit of the systems using a blockchain is that the blockchain maintains a record of each of the data values (e.g., data values D1, D2 in FIG. 5) and the sequence in which the data values that were produced by the oracle. Both the data values and the sequence of the data values would be stored in a blockchain as a log of every message (e.g., message U1, U2 in FIG. 5) and the order in which the messages were produced by the oracle. This information stored on the blockchain would thus provide some additional integrity benefits.

Figure 5:
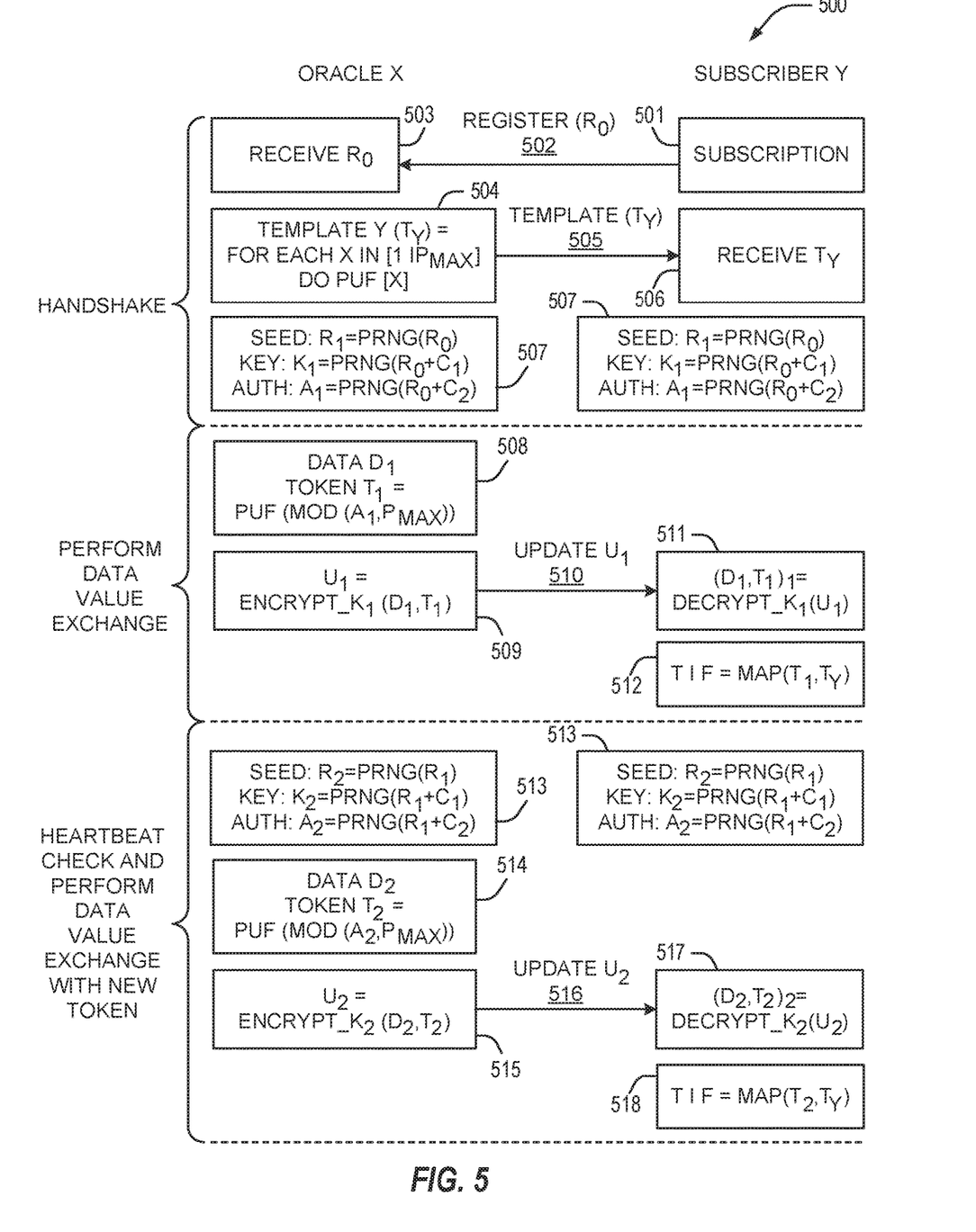
FIG. 5 illustrates a sequence diagram of a method of sensor authentication in a network using memory PUFs, according to an embodiment.

FIG. 5 illustrates a sequence diagram of a method of sensor authentication in a network using memory PUFs, according to an embodiment. The sequence diagram 500 includes the handshake between a subscriber Y on a client device 103_1 and an oracle X (e.g., oracle 101_1), a data value exchange from the oracle X to the subscriber Y, and a liveliness (or heartbeat) check, according to an embodiment. While not illustrated, a number of data value exchanges can be performed using the same token or the new token generated during the heartbeat check. In some embodiments, a plurality of heartbeat checks can be performed to generate a plurality of tokens. In some embodiments, the heartbeat check is optional. Referring to FIG. 8, the oracle X and the subscriber Y can be examples of IoT device 850. For example, the oracle X and subscriber Y can include elements such as a processor 852 and memory 854 storing instructions 888 that cause the oracle X and subscriber Y to perform the operations as illustrated in FIG. 5.

At operation 501, the subscriber Y and the oracle perform registration. During registration, the subscriber Y generates an initial seed $R_0$. In an embodiment, the subscriber Y generates an initialization vector that includes the initial seed $R_0$. The initialization vector can be an initial value that includes the initial seed $R_0$ to start the method 500 in FIG. 5.

At operation 502, the subscriber Y transmits the initial seed $R_0$ (or the initialization vector) to the oracle X. The initial seed $R_0$ can be a random seed. At operation 503, the oracle X receives the initial seed $R_0$. Once transmitted from the subscriber Y, the initial seed $R_0$ is known to both the oracle X and the subscriber Y. In an embodiment, the initial seed $R_0$ is exchanged over a secure distribution channel by the trusted third-party broker (e.g., third-party trust broker 104). In some embodiments, the trusted third-party broker can be a key manager, Kerberos or Fluffy server to both parties: the oracle X and the subscriber Y.

At operation 504, the oracle X computes the authentication template. The authentication template can be a policy that describes which sample data to present to each PUF. If a sequence of PUFs are to be used to process a sample data, the authentication template includes the sequence order. In an embodiment, the authentication template (Template$_Y$) is computed using the superset of possible combinations of PUFs authenticators. For example, in a 1 k (100×100) bit memory vector per PUF, 100 k bytes of memory resource has 800 PUFs and 1 MB memory has 8 k PUFs. The PUFs transformation produce a set of template values that differ from any other oracle's PUF transformations such that there will not be two identical templates given different oracles. In an embodiment, the template includes a PUF array that includes a plurality of PUF entries. In an embodiment that uses multiple PUFs for a single datum, more of the endpoint system is required to be functional. In this embodiment, it can be more difficult for attackers to guess the PUF behavior.

At operation 505, the template (Template$_Y$) is transmitted to the subscriber Y from the oracle X and at operation 506, the subscriber Y receives the template (Template$_Y$).

At operation 507, each side (i.e., oracle X and subscriber Y) generates a next seed $R_1$, a symmetric or MACing key $K_1$, and an authentication nonce $A_1$ using the initial seed $R_0$. In an embodiment, each side (i.e., oracle X and subscriber Y) calculates a three-tuple from the initial seed $R_0$ to generate a next seed $R_1$, a symmetric or MACing key $K_1$, and an authentication nonce $A_1$. In an embodiment, each side uses a pseudo-random number generator (PRNG) and the initial seed $R_0$ as the seed to generate the next seed $R_1$ (e.g., PRNG($R_0$)), the key $K_1$ (e.g., PRNG($R_0$+$C_1$)), where $C_1$ is a first constant), and the authentication nonce $A_1$ (e.g., PRNG($R_0$+$C_2$), where $C_2$ is a second constant).

Given that both the oracle X and the subscriber Y have the same seed $R_0$ and use the same PRNG and constants $C_1$, $C_2$, both the oracle X and the subscriber Y obtain the same values for the next seed $R_1$, key $K_1$, and authentication nonce $A_1$.

When the oracle X has data ($D_1$) to deliver to the subscriber Y, at operation 508, the oracle X generates an authentication token $T_1$ by selecting a PUF or a combination of PUFs and inputting the authentication nonce $A_1$ to produce authentication token T1 as an output. In an embodiment, authentication token $T_1$ is computed as $T_1$=MOD($A_1$, $P_{MAX}$), where $A_1$ is the authentication nonce and $P_{MAX}$ is the number of PUFs. As discussed above, the authentication template can describe which sample data to present to each PUF. The authentication template can capture a sequence order of PUFs to be used to process the sample data. At operation 508, the oracle X can select a PUF or a combination of PUFs based on the authentication template.

Alternatively, in an embodiment, at operation 508, the authentication token $T_1$ is computed by inputting the sensor data value $D_1$ into a PUF$_X$ resulting in a new sensor data value $D_1$' that is specific to the PUF that is used (PUF$_X$). In an embodiment, both the sensor data value $D_1$ and the new sensor data value $D_1$' are both transmitted from the oracle X to the subscriber Y. In an embodiment, the authentication token $T_1$ is the new sensor data value $D_1$'.

In an embodiment, since the authentication token $T_1$ is the result of a MOD operation over a possible search space of PUFs (e.g., $P_{MAX}$), the authentication token $T_1$ will always map (e.g., due to wraparound) to a closed set of authentication values. To prevent different sensor data values to generate the same authentication token and cause ambiguity, the random authentication nonce $A_1$ that has a shared seed value is used to generate the authentication token $T_1$ (e.g., $T_1$=MOD($A_1$, $P_{MAX}$)).

In an embodiment, the authentication token $T_1$, and the key $K_1$ are stored in association with the authentication nonce $A_1$ in the PUF array (in FIG. 2). In an embodiment, the subscriber Y iterates through all of the PUFs $P_1$-$P_{MAX}$ such that for any authentication nonce Ax there is a mapping.

At operation 509, the oracle X then encrypts, or integrity protects the data value $D_1$ and the authentication token $T_1$ using the key Kd1 to generate a resulting message $U_1$. At operation 510, the message $U_1$ is transmitted by the oracle X to the subscriber Y. At operation 511, the subscriber Y receives the message $U_1$ and performs the reverse operation (e.g., decrypts or reverses the integrity protection) to generate the data value $D_1$ and the authentication token $T_1$. Being that the message $U_1$ was encrypted with MACing key $K_1$, the message can be decrypted using the same key, which subscriber Y separately generated (operation 507) (e.g., symmetric encryption).

At operation 512, the subscriber Y then determines whether the authentication token $T_1$ maps to a point or one of the values in the template Y. If so, the data value $D_1$ is authenticated to the oracle X and can be used with the subscriber application. If not, the data value $D_1$ is not authenticated to the oracle X and cannot be used with the subscriber application. In other words, the authentication token $T_1$ that is decrypted by the subscriber Y is an "actual value" and the PUF instance or transaction value corresponding to authentication nonce $A_1$ for this oracle X in the PUF array is the "expected value." Thus, if the "actual value" is found to match with the "expected value," the subscriber Y can authenticate that the data value $D_1$ originates from an authenticated oracle X and the data value $D_1$ is meant for the subscriber Y.

In some embodiments, to ensure that both the oracle X and the subscriber Y obtain the same values for next seed $R_1$, key $K_1$, and authentication nonce $A_1$ at operation 507, the subscriber Y provides an initial data $D_Y$ to the oracle X at operation 502 with the initial seed $S_0$. At operation 507, the subscriber Y would generate the authentication token $T_1$ as discussed in operation 508, encrypt or integrity produce the initial data $D_Y$ and the authentication token $T_1$ using the key $K_1$ to generate the resulting message U1 at operation 509. At operation 510, the oracle X transmits the message $U_1$ to the subscriber Y who receives the message U1 and performs the reverse operation to generate the data value $D_0$, at operation 511. If the generated data value $D_0$ corresponds to the initial data $D_Y$ as transmitted by the subscriber Y at operation 503, the subscriber Y is ensured that both the oracle X and the subscriber Y have the same values for next seed $R_1$, key $K_1$, and authentication nonce $A_1$ at operation 507.

Some trusted computing practices allow for devices (e.g., oracles) with firmware/software components to be "attested to" as part of a device onboarding and deployment operations. An onboarding server (or verifier) may verify the "measurement" (e.g., hash) of the firmware and/or software against a whitelist policy to ensure the firmware and/or software hasn't been tampered with. The device manufacturer can supply the whitelist as part of manufacturing processes and subscribers obtain the whitelist from manufacturers. In an embodiment, the subscriber Y can also place the oracle X on the whitelist device list when the generated data value $D_0$ is the initial data value $D_Y$ as transmitted by the subscriber.

In another embodiment, to ensure that both the oracle X and the subscriber Y obtain the same values for next seed $R_1$, key $K_1$, and authentication nonce $A_1$ at operation 507, the subscriber Y can provide an initial data value $D_Y$ to the oracle X at operation 503 and subsequently, the oracle X can present the initial data value $D_Y$ which is public or semi-public, to authenticate the oracle X with the subscriber Y. The subscriber Y can also place the oracle X on the whitelist device list when the oracle X is authenticated.

To ensure that the oracle X is live and not transmitting stale data values in messages to the subscriber Y, a liveliness check (or heartbeat check) can be performed using the dynamic PUF arrays according to an embodiment. As shown in FIG. 5, at operation 513, each side (i.e., oracle X and subscriber Y) generates a new next seed $R_2$, a new symmetric or MACing key $K_2$, and a new authentication nonce $A_2$, using the seed $R_1$.

In an embodiment, each side (i.e., oracle X and subscriber Y) can calculate a three-tuple from the seed $R_1$ to generate a new next seed $R_2$, a new key $K_2$, and a new authentication nonce $A_2$. In an embodiment, each side uses a pseudo-random number generator (PRNG) and the seed $R_1$ as the seed to generate the new next seed $R_2$ (e.g., $PRNG(R_1)$), the new key $K_2$ (e.g., $PRNG(R_1+C_1)$, where $C_1$ is a first constant), and the new authentication nonce $A_1$ (e.g., $PRNG(R_1+C_2)$, where $C_2$ is a second constant).

At operation 514, when the oracle X has data to deliver to the subscriber Y, the oracle X generates a new authentication token $T_2$ by selecting a PUF or a combination of PUFs and inputting the new authentication nonce $A_2$ to produce the new authentication token $T_2$ as an output. In an embodiment, new authentication token $T_2$ is computed as $T2=MOD(A_2, P_{MAX})$, where $A_2$ is the authentication nonce and $P_{MAX}$ is the number of PUFs.

At operation 515, the oracle X then encrypts, or integrity protects the data value $D_2$ and the authentication token $T_2$ using the key $K_2$ to generate a resulting message $U_2$. At operation 516, the message $U_2$ is transmitted by the oracle X to the subscriber Y. At operation 517, the subscriber Y receives the message $U_1$ and performs the reverse operation (e.g., decrypts or reverse the integrity protection) to generate the data value $D_2$ and the authentication token $T_2$. At operation 518, the subscriber Y then determines whether the authentication token $T_2$ maps to a point or one of the values in the template Y. If so, the data value $D_2$ is authenticated to the oracle X and can be used with the subscriber application.

Using the method 500 and other embodiments herein, oracles can be authenticated inexpensively using memory PUFs that are already available in the given oracles (or sensors) or that can be added for small additional cost. The memory required to support a subscriber Y can be small since it is based on the size of the subscriber context and the size of the seed. For example, a seed of 128 bits (16 bytes) easily supports 1 million or more subscribers.

Figure 6:
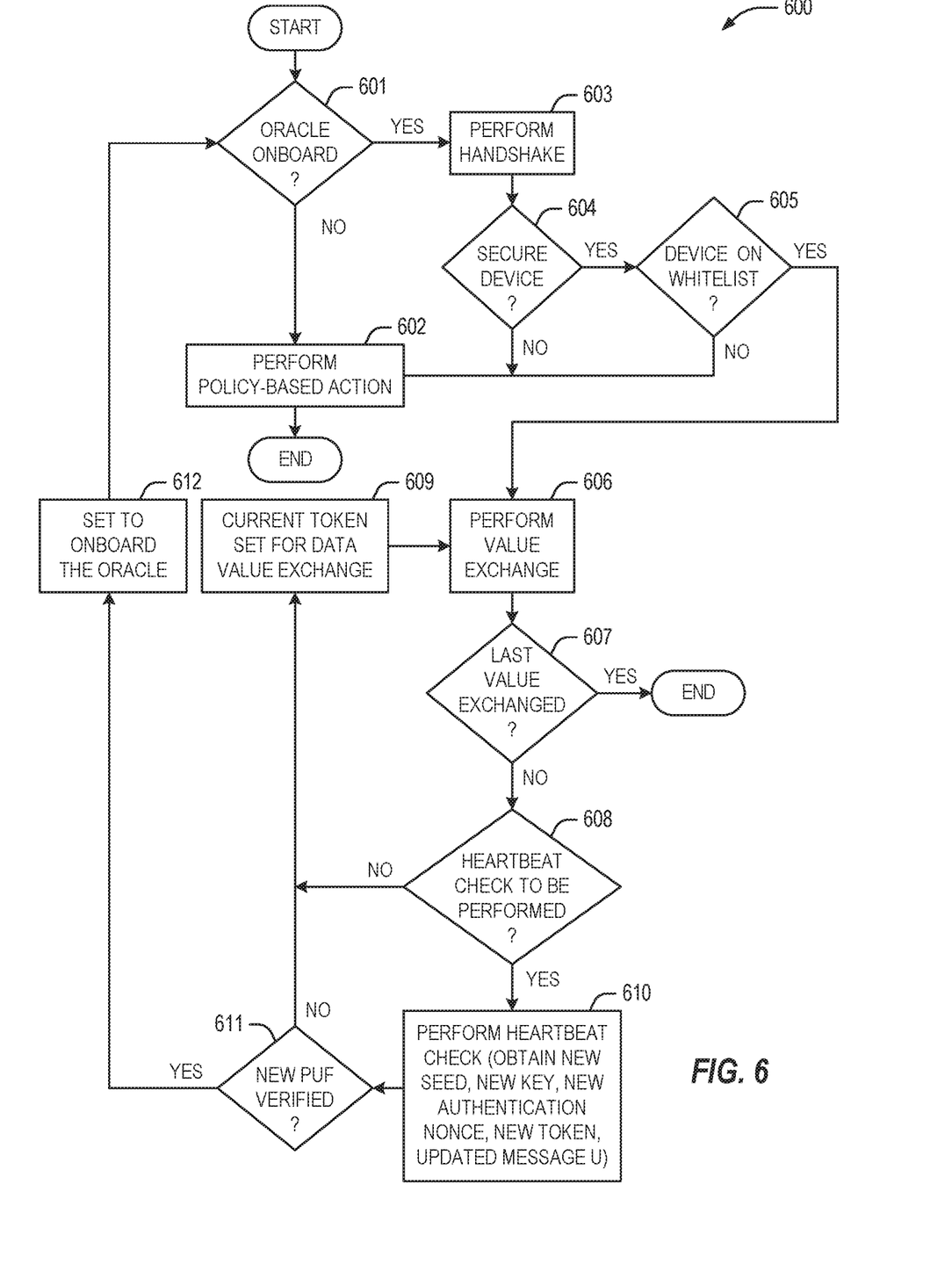
FIG. 6 illustrates an example of a method of sensor authentication in a network using memory PUFs, according to an embodiment.

FIG. 6 illustrates an example of a method 600 of sensor authentication in a network using memory PUFs, according to an embodiment.

The method 600 starts by determining whether there is an oracle to on-board at Block 601. In an embodiment, it is determined that an oracle is to be on-boarded when an oracle that engages in a discovery protocol is detected on the network. The Oracle may engage in a discovery protocol, such as Open Connectivity Foundation (OCF), Wifi-Alliance, Alljoyn, Bluetooth, that establishes an oracle device is present on a network. In an embodiment, as further described below, it is determined that an oracle is to be on-boarded when the initialization steps succeed, and the attestation and the whitelist check also succeed.

If there is no oracle to onboard, a policy-based action is performed at Block 602. Policy-based actions include, for example, ending the sensor authentication session and/or logging the transaction in a blockchain. If there is an oracle to onboard, the handshake from FIG. 5 between the subscriber Y and Oracle X is performed at Block 603.

At Block 604, it is determined whether the oracle is a secure device based on the results of the handshake performed in Block 603. If, at Block 604, the oracle is determined to not be a secure device, the policy-based action is performed at Block 602. If, at Block 604, the oracle is determined to be a secure device, the whitelist is checked to determine whether the oracle is on the whitelist at Block 605. In an embodiment, the whitelist includes a list of oracles that are previously authenticated. While the oracle is determined to be a secure device at Block 604, the whitelist is checked at Block 605 to ensure that an attacker is not manipulating the PUFs. If the device fails attestation, then the device may have been attacked. The device can be trying to manipulate the PUFs in a way that fools the verifier into believing the device is producing non-faked values.

If, at Block 605, the oracle is determined to not be on the whitelist, the policy-based action is performed at Block 602. If at Block 605, the oracle is determined to be on the whitelist, the data value exchange between the subscriber Y and Oracle X from FIG. 5 is performed at Block 606.

If, at Block 607, the last data value is determined to be exchanged, the method 600 terminates. If, at Block 607, the more data values are to be exchanged, at Block 608, it is determined whether a heartbeat check is to be performed. If no heartbeat check is to be performed at Block 608, the current token is set for data value exchange at Block 609 and the method 600 continues to perform data value exchange at Block 606.

If a heartbeat check is to be performed at Block 608, the heartbeat check from FIG. 5 is performed at Block 610. In an embodiment, the heartbeat check can be performed at regular intervals. In an embodiment, the heartbeat check can be performed at an interval or a timing set by a subscriber policy.

At Block 611, the method 600 determines whether the new PUF entry is to be verified. The new PUF entry can be generated as a result of the heartbeat check in Block 610. If the new PUF is not to be verified, the current token is set for data value exchange at Block 609 and the method 600 continues to perform data value exchange at Block 606. If the new PUF entry is to be verified, the method 600 sets to onboard the oracle to verify the new PUF entry at Block 612. The method 600 continues to Block 601 to determine that onboarding of the oracle is needed.

FIG. 7 illustrates a drawing of a cloud-computing network, or cloud 700, in communication with a number of Internet of Things (IoT) devices. The cloud 700 can represent the Internet, or can be a local area network (LAN), or a wide area network (WAN), such as a proprietary network for a company. For example, a traffic control group 706 can include IoT devices along streets in a city. These IoT devices can include stoplights, traffic flow monitors, cameras, weather sensors, and the like. The traffic control group 706, or other subgroups, can be in communication with the cloud 700 through wired or wireless links 708, such as LPWA links, optical links, and the like. Further, a wired or wireless sub-network 712 can enable the IoT devices to communicate with each other, such as through a local area network, a wireless local area network, and the like. The IoT devices can use another device, such as a gateway 710 or 728 to communicate with remote locations such as the cloud 700; the IoT devices can also use one or more servers 730 to facilitate communication with the cloud 700 or with the gateway 710. For example, the one or more servers 730 can operate as an intermediate network node to support a local edge cloud or fog implementation among a local area network. Further, the gateway 728 that is depicted can operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices can be in communication with other IoT devices, with servers 704, with another IoT fog device or system (not shown in FIG. 7, but depicted as system 100 in FIG. 1), or a combination therein. The groups of IoT devices can be deployed in various residential, commercial, and industrial settings (including in either private or public environments).

As can be seen from FIG. 7, a large number of IoT devices can be communicating through the cloud 700. This can allow different IoT devices to request or provide information to other devices autonomously. For example, a group of IoT devices (e.g., the traffic control group 706) can request a current weather forecast from a group of remote weather stations 714, which can provide the forecast without human intervention.

Further, an emergency vehicle 724 can be alerted by an automated teller machine 720 that a burglary is in progress. As the emergency vehicle 724 proceeds towards the automated teller machine 720, it can access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, can be equipped to communicate with other IoT devices as well as with the cloud 700. This can enable the IoT devices to form an ad-hoc network between the devices, enabling them to function as a single device, which can be termed a fog device or system (e.g., as in system 100 described above with reference to FIG. 1).

FIG. 8 is a block diagram for an example IoT processing system architecture, of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include a processor 852, which may be a microprocessor, a multi-core processor, a multi-threaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee® or other intermediate power radios. Both communications techniques may take place over a single radio at different power levels, or may take place over separate transceivers, for example, a local transceiver using BLE and a separate mesh transceiver using ZigBee®.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, Calif., among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may be embodied by devices described for the storage 858 of FIG. 8 or may include specific storage units such as optical disks, flash drives, or any number of other hardware devices. The non-transitory, machine readable medium 860 may further include, provide, or invoke instructions 888 to direct the processor 852 to perform a specific sequence or flow of actions, for example, as described with respect to the flowchart(s) and block diagram(s) of operations and functionality depicted above.

In an example, the instructions 888 on the processor 852 (separately, or in combination with the instructions 888 of the machine readable medium 860) may configure execution or operation of a trusted execution environment (TEE) 890. In an example, the TEE 890 operates as a protected area accessible to the processor 852 to enable secure access to data and secure execution of instructions. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 9:
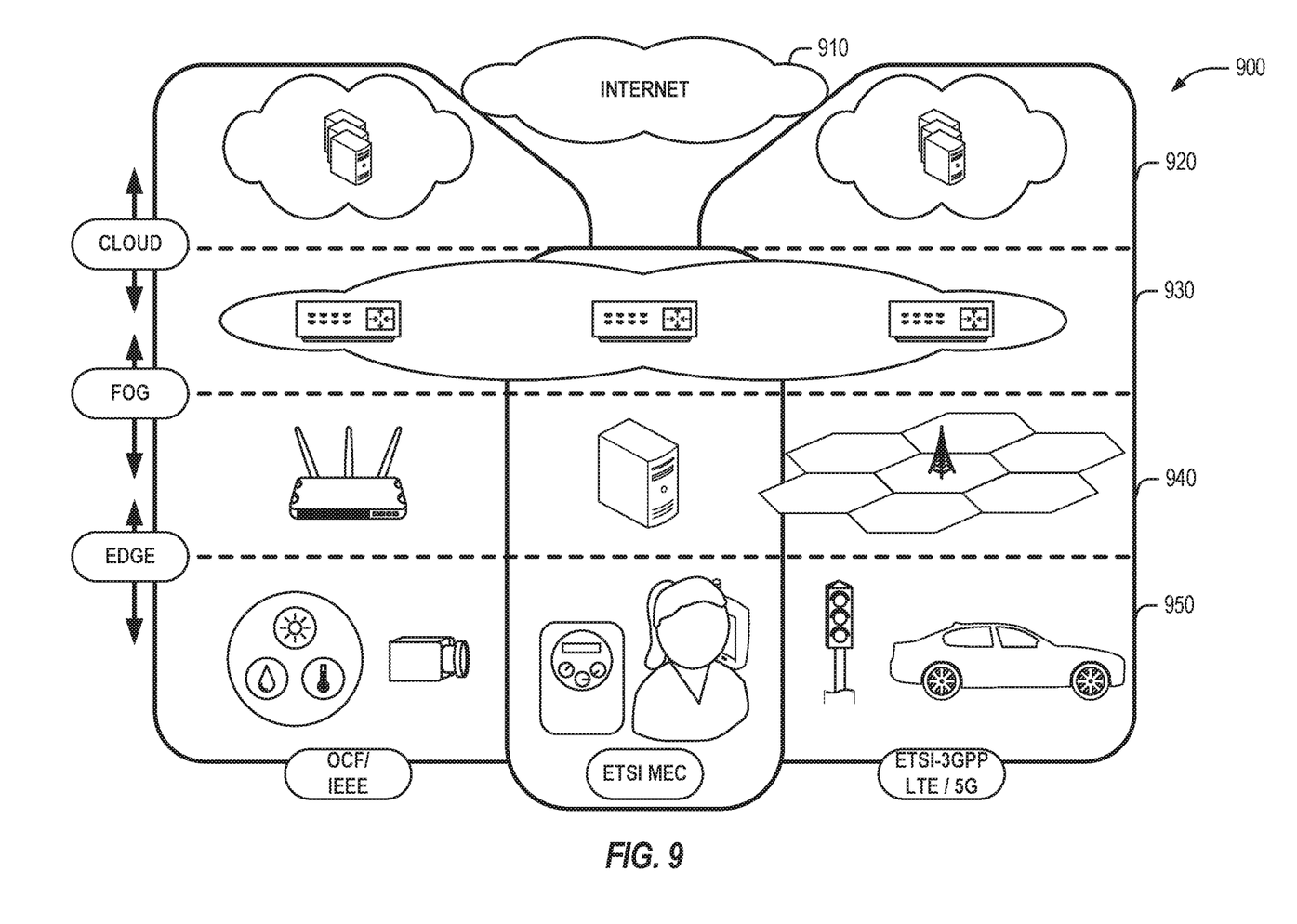
FIG. 9 illustrates a system of networked components, according to an example.

FIG. 9 illustrates a system 900 of networked components in various IoT and infrastructure settings, according to an example. The system 900 may include devices, services, or networks configured to communicate using OCF/IEEE communications standards (e.g., as defined above), ETSI Mobile Edge Computing or Multi-access Edge Computing (MEC) communications standards, or ETSI-3GPP (e.g., LTE, 5G) communications standards. The networked components of system 900 communicate across different levels of network topologies, such as the Internet 910, cloud devices 920, routing devices 930, station/access point/server connection devices 940, and end devices 950.

As further examples of the concepts discussed in FIGS. 1, 7 and 8, above, the various layers and networked components may be generally categorized as cloud (Internet 910, cloud devices 920), fog (routing devices 930, station/access point/server connection devices 940), and edge devices (station/access point/server connection devices 940, end devices 950), although any of the networked components may be set up to operate in any of the layers. A fog network may represent a dense geographical distribution of near-user edge devices (e.g., fog nodes), equipped with storage capabilities (e.g., to avoid the need to store data in cloud data centers), communication capabilities (e.g., rather than routed over the Internet backbone), control capabilities, configuration capabilities, measurement and management capabilities (rather than controlled primarily by network gateways such as those in the LTE core network), among others.

The end devices 950 may include IoT devices or hosts, including vehicles, mobile devices, sensors, or the like. The station/access point/server connection devices 940 may include a wireless access point (e.g., for Wi-Fi), a server or other connection device (which may include a mobile device, such as a phone or a tablet), or a station (e.g., a base station or Node B, such as an enhanced Node B (eNB), according to 3GPP specifications). The routing devices 930 may include a switch, a server, a router, or the like, which may be physical or virtual. The cloud devices 920 may be servers or other devices. The internet 910 may represent other devices or servers not within the system 900.

MEC may encompass an architecture that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by ETSI, such as in the "Mobile Edge Computing Introductory Technical White Paper," published Sep. 1, 2014.

In MEC implementations of the system 900, a device (e.g., a server) may be used as a mobile edge host, such as a localized server (e.g., a street server, embedded in a traffic signal device or system, etc.). Another device in the system 900 may be used as an end device (e.g., a mobile device such as a phone, a laptop, a tablet, an IoT device, a vehicle, etc.). The end device may communicate with the localized server to offload computationally intensive applications or actions such as graphical rendering (e.g., high-speed browsing artificial reality or virtual reality, 3D gaming applications, video processing etc.), intermediate data-processing (e.g., sensor data cleansing, video analysis, etc.), or value-added services (e.g., translation, log analytics, etc.).

An end device may initiate a MEC service for a specific application or action, which may be started on an appropriate MEC host (e.g., the localized server). The application may have a set of requirements (e.g. latency, compute resources, storage resources, location, network capability, security condition etc.) that are fulfilled by the MEC host (e.g., server). The system 900 may select a host fulfilling the requirements (e.g., by using the station/access point/server connection devices 940).

The MEC implementation of system 900 may be used to improve application and service mobility and service continuation among multiple edge computing hosts and groups (such as for automobiles, or user movement within and in/outside of service areas). Application and service customization at the MEC host for network operator-trusted mobile edge applications (e.g., for targeted advertising, enterprise services, group-based content, subscriber content) may be implemented using the system 900.

MEC offers application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments. It will be apparent that the use of devices, services, applications, and resources in this fashion will implicate many aspects of access control and management. Accordingly, authentication techniques discussed above with reference to FIGS. 1 to 6 may be performed or coordinated in a MEC implementation. Further, the preceding techniques, although described with reference to OCF examples, may also be equally implemented in a variety of other IoT standards implementations.

ADDITIONAL NOTES & EXAMPLES

Example 1 is a method of oracle authentication in a network using a plurality of memory physical unclonable functions (PUFs), the method comprising: receiving, by an oracle, an initialization vector from a client device, wherein the initialization vector includes an initial seed value; producing, by the oracle, a template, wherein the template includes a PUF array, and wherein the template is computed using a superset of combinations of PUFs included in the oracle; transmitting, by the oracle, the template to the client device; generating, by the oracle, a first seed value, a first key, and a first authentication nonce, using a pseudorandom number generator and the initial seed value; and when the oracle has a first data to be sent to the client device, generating, by the oracle, a first token using the PUF array and the first authentication nonce, generating, by the oracle, a first message by encrypting the first data and the first token using the first key, and transmitting, by the oracle, the first message to the client device.

In Example 2, the subject matter of Example 1 includes: selecting one or more PUFs using the first authentication nonce as an input to generate the first token as an output.

In Example 3, the subject matter of Example 1, includes: generating, by the client device, the initial seed value and the initialization vector; receiving, by the client device, the template; generating, by the client device, the first seed value, the first key, and the first authentication nonce, using the pseudorandom number generator and the initial seed value; decrypting, by the client device, the first message from the oracle using the first key to obtain the first data and the first token; and authenticating, by the client device, the first data, wherein authenticating the first data includes determining whether the first token maps to one of the values in the template.

In Example 4, the subject matter of Example 1 includes, wherein the client device: generates the initial seed value and the initialization vector; receives the template; generates the first seed value, the first key, and the first authentication nonce, using the pseudorandom number generator and the initial seed value; decrypts the first message from the oracle using the first key to obtain the first data and the first token; and authenticates the first data, wherein authenticating the first data includes determining whether the first token maps to one of the values in the template.

In Example 5, the subject matter of Examples 1 and 4 includes: wherein the first data is authenticated when the first token maps to one of the values in the template, and the first data is not authenticated when the first token does not map to one of the values in the template.

In Example 6, the subject matter of Examples 1 and 4 includes: wherein the initial seed is exchanged between the client device and the oracle over a secure distribution channel established by a trusted third-party server.

In Example 7, the subject matter of Examples 1 and 4 includes: wherein the first key is a symmetric encryption key or a MACing key.

In Example 8, the subject matter of Examples 1 and 4 includes: generating, by the oracle, a second seed value, a second key, and a second authentication nonce, using the pseudorandom number generator and the first 1 seed value; and when the oracle has a second data to be sent to the client device, generating, by the oracle, a second token using the PUF array and the second authentication nonce, generating, by the oracle, a second message by encrypting the second data and the second token using the second key, and transmitting, by the oracle, the second message to the client device.

In Example 9, the subject matter of Examples 1 and 8 includes: generating, by the client device, the second seed value, the second key, and the second authentication nonce, using the pseudorandom number generator and the first seed value; decrypting, by the client device, the second message from the oracle using the second key to obtain the second data and the second token; and authenticating, by the client device, the second data, wherein authenticating the second data includes determining whether the second token maps to one of the values in the template.

In Example 10, the subject matter of Examples 1 and 8, wherein the client device: generate the second seed value, the second key, and the second authentication nonce, using the pseudorandom number generator and the first seed value; decrypt the second message from the oracle using the second key to obtain the second data and the second token; and authenticate the second data, wherein authenticating the second data includes determining whether the second token maps to one of the values in the template.

In Example 11, the subject matter of Examples 1 and 9 includes: wherein a trusted third-party server includes a blockchain database that includes a plurality of local blockchain copies associated respectively with a plurality of oracles in the network.

In Example 12, the subject matter of Examples 1 and 11 includes: wherein the local blockchain copies include transaction knowledge and relevant events received from the plurality of oracles, wherein the relevant events include at least one of: PUF arrays, geolocation, and time.

Example 13 is a system of oracle authentication in a network using a plurality of memory physical unclonable functions (PUFs), the system comprising: a plurality of oracles including a first oracle, wherein the first oracle produces a template including a PUF array, and wherein the template is computed using a superset of combinations of PUFs included in the first oracle, and the first oracle generates a first seed value, a first key, and a first authentication nonce, using a pseudorandom number generator and an initial seed value; and a plurality of client devices coupled to the plurality of oracles via the network, the client devices including a first client device, wherein the first client device generates the initial seed value, and transmits the initial seed value to the first oracle using a trusted third party server, the first client device receives the template from the first oracle, generates the first seed value, the first key, and the first authentication nonce using the pseudorandom number generator and the initial seed, wherein, when the first oracle has a first data to be sent to the first client device, the first oracle generates a first token using the PUF array and the first authentication nonce, generates a first message by encrypting the first data and the first token using the first key, and transmits the first message to the client device, and the first client device decrypts the first message from the oracle using the first key to obtain the first data and the first token, and authenticates the first data, by determining whether the first token maps to one of the values in the template.

In Example 14, the subject matter of Example 13 includes: wherein each of the oracles in the plurality of oracles generates templates, respectively, and each of the templates is computed using a superset of combinations of PUFs included in the oracles, respectively, wherein all the templates generated by the oracles are different.

In Example 15, the subject matter of Example 13 includes: wherein the first oracle generating the first token includes selecting one or more PUFs using the first authentication nonce as an input to generate the first token as an output.

In Example 16, the subject matter of Example 13 includes: wherein the first data is authenticated when the first token maps to one of the values in the template, and the first data is not authenticated when the first token does not map to one of the values in the template.

In Example 17, the subject matter of Example 13 includes: wherein the first key is a symmetric encryption key or a MACing key.

In Example 18, the subject matter of Example 13 includes: wherein the initial seed is exchanged between the first client device and the first oracle over a secure distribution channel established by the trusted third-party server.

In Example 19, the subject matter of Example 13 includes: wherein the trusted third-party server includes a blockchain database that includes a plurality of local blockchain copies associated respectively with a plurality of oracles in the network.

In Example 20, the subject matter of Examples 13 and 19 includes: wherein the local blockchain copies include transaction knowledge and relevant events received from the plurality of oracles, wherein the relevant events include at least one of: PUF arrays, geolocation or time.

Example 21 is a non-transitory computer-readable storage medium, having instructions stored thereon, when executed by a processor, causes the processor to perform a method of oracle authentication in a network using a plurality of memory physical unclonable functions (PUFs), the method comprising: receiving an initialization vector from a client device, wherein the initialization vector includes an initial seed value, producing a template, wherein the template includes a PUF array, and wherein the template is computed using a superset of combinations of PUFs included in the oracle; transmitting the template to the client device; generating a first seed value, a first key, and a first authentication nonce, using a pseudorandom number generator and the initial seed value; and when the oracle has a first data to be sent to the client device, generating a first token using the PUF array and the first authentication nonce, generating a first message by encrypting the first data and the first token using the first key, and transmitting the first message to the client device.

In Example 22, the subject matter of Example 21 includes, wherein generating the first token includes selecting one or more PUFs using the first authentication nonce as an input to generate the first token as an output.

In Example 23, the subject matter of Example 21 includes, wherein the first key is a symmetric encryption key or a MACing key.

In Example 24, the subject matter of Example 21 includes, wherein the initial seed is received from the client device over a secure distribution channel established by a trusted third-party server.

Example 25 is a non-transitory computer-readable storage medium, having instructions stored thereon, when executed by a processor, causes the processor to perform a method of oracle authentication in a network using a plurality of memory physical unclonable functions (PUFs), the method comprising: generating an initial seed value and the initialization vector that is transmitted to an oracle; receiving a template from the oracle, wherein the template includes a PUF array based on a superset of combinations of PUFs included in the oracle; generating the first seed value, the first key, and the first authentication nonce using a pseudorandom number generator and the initial seed value, decrypting a first message from the oracle using the first key to obtain a first data and a first token; and authenticating the first data by determining whether the first token maps to one of the values in the template.

In Example 26, the subject matter of Example 25 includes, wherein the first data is authenticated when the first token maps to one of the values in the template, and the first data is not authenticated when the first token does not map to one of the values in the template.

In Example 27, the subject matter of Example 25 includes, wherein the first key is a symmetric encryption key or a MACing key.

In Example 28, the subject matter of Example 25 includes, wherein the initial seed is transmitted the oracle over a secure distribution channel established by a trusted third-party server.

Example 29 is a method of oracle authentication in a network using a plurality of memory physical unclonable functions (PUFs), the method comprising: receiving an initialization vector from a client device, wherein the initialization vector includes an initial seed value; producing a template, wherein the template includes a PUF array, and wherein the template is computed using a superset of combinations of PUFs included in the oracle; transmitting the template to the client device; generating a first seed value, a first key, and a first authentication nonce, using a pseudorandom number generator and the initial seed value; and when the oracle has a first data to be sent to the client device, generating a first token using the PUF array and the first authentication nonce, generating a first message by encrypting the first data and the first token using the first key, and transmitting the first message to the client device.

In Example 30, the subject matter of Example 29 includes, wherein generating the first token includes selecting one or more PUFs using the first authentication nonce as an input to generate the first token as an output.

In Example 31, the subject matter of Example 29 includes, wherein the first key is a symmetric encryption key or a MACing key.

In Example 32, the subject matter of Example 29 includes, wherein the initial seed is received from the client device over a secure distribution channel established by a trusted third-party server.

Example 33 is a method of oracle authentication in a network using a plurality of memory physical unclonable functions (PUFs), the method comprising: generating an initial seed value and the initialization vector that is transmitted to an oracle; receiving a template from the oracle, wherein the template includes a PUF array based on a superset of combinations of PUFs included in the oracle; generating the first seed value, the first key, and the first authentication nonce using a pseudorandom number generator and the initial seed value, decrypting a first message from the oracle using the first key to obtain a first data and a first token; and authenticating the first data by determining whether the first token maps to one of the values in the template.

In Example 34, the subject matter of Example 33 includes, wherein the first data is authenticated when the first token maps to one of the values in the template, and the first data is not authenticated when the first token does not map to one of the values in the template.

In Example 35, the subject matter of Example 33 includes, wherein the first key is a symmetric encryption key or a MACing key.

In Example 36, the subject matter of Example 33 includes, wherein the initial seed is transmitted the oracle over a secure distribution channel established by a trusted third-party server.

Example 37 is at least one machine-readable medium including instructions, which when executed by a machine, cause the machine to perform operations of any of the operations of examples 1-36.

Example 38 is an apparatus comprising means for performing any of the operations of examples 1-36.

Example 39 is a system to perform the operations of any of the examples 1-36.

Example 40 is a method to perform the operations of any of the Examples 1-36.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system of oracle authentication in a network using a plurality of memory physical unclonable functions (PUFs), the system comprising:
    a plurality of oracles including a first oracle, wherein
    the first oracle produces a template including a PUF array, and wherein the template is computed using a superset of combinations of PUFs included in the first oracle, and the first oracle generates a first seed value, a first key, and a first authentication nonce using a pseudorandom number generator and an initial seed value; and
    a plurality of client devices coupled to the plurality of oracles via the network, the client devices including a first client device, wherein the first client device generates the initial seed value, and transmits the initial seed value to the first oracle using a trusted third party server, the first client device receives the template from the first oracle, generates the first seed value, the first key, and the first authentication nonce using the pseudorandom number generator and the initial seed,
    wherein, when the first oracle has a first data to be sent to the first client device, the first oracle generates a first token using the PUF array and the first authentication nonce, generates a first message by encrypting the first data and the first token using the first key, and transmits the first message to the client device, and
    the first client device decrypts the first message from the oracle using the first key to obtain the first data and the first token, and authenticates the first data, by determining whether the first token maps to one of a plurality of values in the template.

2. The system of claim 1, wherein each of the oracles in the plurality of oracles generates templates, respectively, and each of the templates is computed using a superset of combinations of PUFs included in the oracles, respectively, wherein all the templates generated by the oracles are different.

3. The system of claim 1, wherein the first oracle generating the first token includes selecting one or more PUFs using the first authentication nonce as an input to generate the first token as an output.

4. The system of claim 1, wherein the first data is authenticated when the first token maps to one of the plurality of values in the template, and the first data is not authenticated when the first token does not map to one of the plurality of values in the template.

5. The system of claim 1, wherein the first key is a symmetric encryption key or a Message Authentication Checking (MACing) key.

6. The system of claim 1, wherein the initial seed is exchanged between the first client device and the first oracle over a secure distribution channel established by the trusted third-party server.

7. The system of claim 1, wherein the trusted third-party server includes a blockchain database that includes a plurality of local blockchain copies associated respectively with a plurality of oracles in the network.

8. The system of claim 7, wherein the local blockchain copies include transaction knowledge and relevant events received from the plurality of oracles, wherein the relevant events include at least one of: PUF arrays, geolocation or time.

9. A method of oracle authentication in a network using a plurality of memory physical unclonable functions (PUFs), the method comprising:
    receiving, by an oracle, an initialization vector from a client device, wherein the initialization vector includes an initial seed value;
    producing, by the oracle, a template, wherein the template includes a PUF array, and
    wherein the template is computed using a superset of combinations of PUFs included in the oracle;
    transmitting, by the oracle, the template to the client device;
    generating, by the oracle, a first seed value, a first key, and a first authentication nonce, using a pseudorandom number generator and the initial seed value; and
    when the oracle has a first data to be sent to the client device,
    generating, by the oracle, a first token using the PUF array and the first authentication nonce,
    generating, by the oracle, a first message by encrypting the first data and the first token using the first key, and
    transmitting, by the oracle, the first message to the client device.

10. The method of claim 9, wherein generating, by the oracle, the first token includes: selecting one or more PUFs using the first authentication nonce as an input to generate the first token as an output.

11. The method of claim 9, further comprising:
    generating, by the client device, the initial seed value and the initialization vector;
    receiving, by the client device, the template;
    generating, by the client device, the first seed value, the first key, and the first authentication nonce, using the pseudorandom number generator and the initial seed value;
    decrypting, by the client device, the first message from the oracle using the first key to obtain the first data and the first token; and
    authenticating, by the client device, the first data, wherein authenticating the first data includes determining whether the first token maps to one of a plurality of values in the template.

12. The method of claim 11, wherein the first data is authenticated when the first token maps to one of the plurality of values in the template, and the first data is not authenticated when the first token does not map to one of the plurality of values in the template.

13. The method of claim 11, wherein the initial seed is exchanged between the client device and the oracle over a secure distribution channel established by a trusted third-party server.

14. The method of claim 11, wherein the first key is a symmetric encryption key or a Message Authentication Checking (MACing) key.

15. The method of claim 11, further comprising:
generating, by the oracle, a second seed value, a second key, and a second authentication nonce, using the pseudorandom number generator and the first seed value; and
when the oracle has a second data to be sent to the client device,
generating, by the oracle, a second token using the PUF array and the second authentication nonce,
generating, by the oracle, a second message by encrypting the second data and the second token using the second key, and
transmitting, by the oracle, the second message to the client device.

16. The method of claim 15, further comprising;
generating, by the client device, the second seed value, the second key, and the second authentication nonce, using the pseudorandom number generator and the first seed value;
decrypting, by the client device, the second message from the oracle using the second key to obtain the second data and the second token; and
authenticating, by the client device, the second data, wherein authenticating the second data includes determining whether the second token maps to one of a plurality of values in the template.

17. The method of claim 16, wherein a trusted third-party server includes a blockchain database that includes a plurality of local blockchain copies associated respectively with a plurality of oracles in the network.

18. The method of claim 17, wherein the local blockchain copies include transaction knowledge and relevant events received from the plurality of oracles, wherein the relevant events include at least one of: PUF arrays, geolocation, and time.

19. A non-transitory computer-readable storage medium, having instructions stored thereon, when executed by a processor, causes the processor to perform a method of oracle authentication in a network using a plurality of memory physical unclonable functions (PUFs), the method comprising:
receiving an initialization vector from a client device, wherein the initialization vector includes an initial seed value;
producing a template, wherein the template includes a PUF array, and wherein the template is computed using a superset of combinations of PUFs included in an oracle;
transmitting the template to the client device;
generating a first seed value, a first key, and a first authentication nonce, using a pseudorandom number generator and the initial seed value; and
when the oracle has a first data to be sent to the client device,
generating a first token using the PUF array and the first authentication nonce, generating a first message by encrypting the first data and the first token using the first key, and
transmitting the first message to the client device.

20. The non-transitory storage medium of claim 19, wherein generating the first token includes selecting one or more PUFs using the first authentication nonce as an input to generate the first token as an output.

21. The non-transitory storage medium of claim 19, wherein the first key is a symmetric encryption key or a Message Authentication Checking (MACing) key.

22. The non-transitory storage medium of claim 19, wherein the initial seed is received from the client device over a secure distribution channel established by a trusted third-party server.

23. A non-transitory computer-readable storage medium, having instructions stored thereon, when executed by a processor, causes the processor to perform a method of oracle authentication in a network using a plurality of memory physical unclonable functions (PUFs), the method comprising:
generating an initial seed value and the initialization vector that is transmitted to an oracle;
receiving a template from the oracle, wherein the template includes a PUF array based on a superset of combinations of PUFs included in the oracle;
generating the first seed value, the first key, and the first authentication nonce using a pseudorandom number generator and the initial seed value,
decrypting a first message from the oracle using the first key to obtain a first data and a first token; and
authenticating the first data by determining whether the first token maps to one of a plurality of values in the template.

24. The non-transitory storage medium of claim 23, wherein the first data is authenticated when the first token maps to one of the plurality of values in the template, and the first data is not authenticated when the first token does not map to one of the plurality of values in the template.

25. The non-transitory storage medium of claim 23, wherein the first key is a symmetric encryption key or a Message Authentication Checking (MACing) key.

* * * * *